United States Patent
Anderson et al.

(10) Patent No.: US 8,683,358 B2
(45) Date of Patent: Mar. 25, 2014

(54) APPLICATION ELEMENT GROUP OPERATIONS ALLOWING DUPLICATION WHILE PRESERVING INTERDEPENDENT LOGIC

(75) Inventors: Doug Anderson, Edmonds, WA (US); Kenneth Y. Ogami, Bothell, WA (US); Marat Zhaksilikov, Snohomish, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 624 days.

(21) Appl. No.: 11/512,544

(22) Filed: Aug. 29, 2006

(65) Prior Publication Data

US 2007/0130530 A1  Jun. 7, 2007

Related U.S. Application Data

(60) Provisional application No. 60/741,949, filed on Dec. 1, 2005.

(51) Int. Cl.
*G06F 3/00* (2006.01)
(52) U.S. Cl.
USPC ........... 715/762; 715/764; 715/765; 715/769; 715/967; 715/970; 703/13
(58) Field of Classification Search
USPC ......... 715/762, 764, 765, 767, 769, 967, 970; 717/105, 109, 113; 345/619
See application file for complete search history.

(56) References Cited

U.S. PATENT DOCUMENTS

| 2001/0037338 A1* | 11/2001 | Stockley | 707/101 |
| 2007/0132779 A1* | 6/2007 | Gilbert et al. | 345/619 |
| 2007/0157150 A1* | 7/2007 | Ogami et al. | 716/16 |

OTHER PUBLICATIONS

IBM Technical Disclosure Bulletin, "Graphical Procedrual Capapbility", Apr. 1991, pp. 1-11.*
SAS, "SAS 9.1.3 Open Metadata Interface", 1st Printing: Jul. 2005, 2nd Edition, pp. 140-141.*
Cypress, Application Note, "PSoC Express™ Primer: First Introduction," AN2261, Revision A, Mar. 15, 2005, pp. 1-19.
Cypress Microsystems, Application Note, "Global Resources in PSoC™ Designer," AN2221, Revision A, Oct. 15, 2004, pp. 1-6.
Cypress Perform, PSoC Designer™, IDE User Guide, Document # 38-12002 Rev. E, 2002-2005, pp. 2-160.
SAS, "SAS 9.1.3 Open Metadata Interface", 1st Printing: Jul. 2005, 2nd Edition, pp. 1-320.

* cited by examiner

*Primary Examiner* — Dennis Chow
*Assistant Examiner* — Shen (Connie) Shiau

(57) ABSTRACT

In one embodiment, an application design method includes identifying one or more application objects selected by a user when designing an application and identifying dependencies associated with the selected objects. The method further includes duplicating the selected objects and the associated dependencies. In another embodiment, the one or more objects comprise at least one of a valuator, an input and an output.

21 Claims, 12 Drawing Sheets

US 8,683,358 B2

APPLICATION ELEMENT GROUP OPERATIONS ALLOWING DUPLICATION WHILE PRESERVING INTERDEPENDENT LOGIC

CROSS-REFERENCE TO RELATED APPLICATIONS

This application claims the benefit of U.S. Provisional Application No. 60/741,949, filed Dec. 1, 2005, and incorporated herein by reference in its entirety.

BACKGROUND

1. Field

Embodiments of the invention relate generally to application development and more specifically, but not exclusively, to facilitating duplication of application elements during application development.

2. Background Information

Shortened time to design and user error reduction are essential to the success of application development environments. Current application development environments are geared towards system engineers. System engineers often repeat patterns of design subsets when developing an application. A design subset may include, for example, input, output and logic controlling the dependency between input and output. Conventional application development techniques do not provide efficient tools for facilitating the duplication of design subsets. In particular, a user wishing to duplicate N sets of application objects of the same type with similar dependencies would typically have to create each set of application objects by hand, repeating every step N times. Such a process is inefficient and error prone.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description and claims, the term "coupled" and its derivatives may be used. "Coupled" may mean that two or more elements are in direct contact (physically, electrically, magnetically, optically, etc.). "Coupled" may also mean two or more elements are not in direct contact with each other, but still cooperate or interact with each other.

Embodiments of the present invention enable the duplication of sets of application elements while preserving their dependencies. As a result, a user can design complex applications that contain repeating patterns via a graphical means of aggregation, duplication and customization. This reduces errors and repetition of steps by a user.

Figure 1:
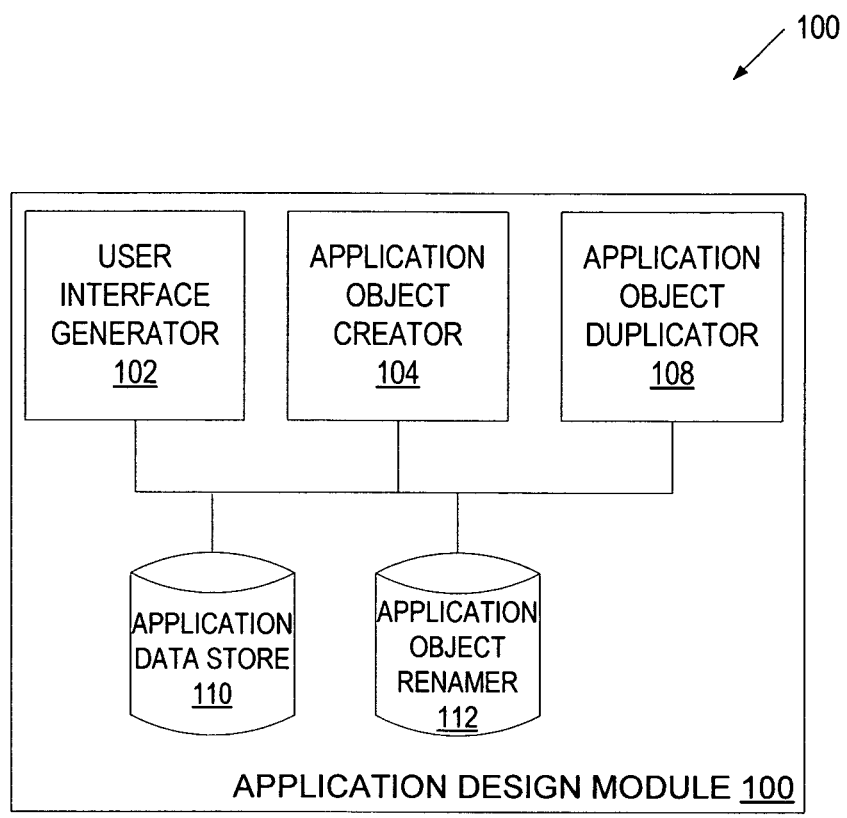
FIG. 1 is a block diagram of one embodiment of an application design module that facilitates the duplication of application elements.

FIG. 1 is a block diagram of one embodiment of an application design module 100 that facilitates the duplication of application elements. The application design module 100 includes a user interface (UI) generator 102, an application object creator 104, an application object duplicator 108, an application data store 110 and an application object renamer 112.

The UI generator 102 generates an application design UI that assists a user in designing an application. In one embodiment, the application is an embedded application constructed for implementation on a processing device such as a microcontroller. As will be discussed in more detail below, the application design UI allows a user to identify various objects for the application. These objects may include, for example, application inputs (e.g., input devices, device interfaces, input/control registers, etc.), application outputs (e.g., output devices, output/status registers, etc.), valuators that evaluate input data, etc. In one embodiment, the application design UI allows a user to specify parameters for the application objects and define behavior of the valuators and outputs. In particular, the user may be allowed to specify how states of valuators and outputs will change in response to changes in other application objects. In one embodiment, the application design UI also allows a user to request duplication of existing application objects, as will be discussed in more detail below.

The application object creator 104 creates application objects specified by the user and stores data describing these application objects in the application data store 110. This data may include, for example, names of application objects, parameters of each application object, dependencies between the application objects, etc. The application data store 110 may be a database, a file, a collection of files, etc.

The application object duplicator 108 is responsible for duplicating existing application objects in response to a user request, and storing data describing the duplicated objects in the application data store 110. In one embodiment, the application object duplicator 108 receives a user request for duplication when the user selects application objects on the screen and then chooses a duplication option for the selected application objects. In one embodiment, the application object duplicator 108 preserves all dependencies when duplicating the application objects. In particular, in one embodiment, the application object duplicator 108 maintains all dependencies between duplicated objects and non-duplicated objects (external dependencies), and duplicates dependencies between every two objects that are both duplicated (internal dependencies). The duplication does not affect any dependencies on the existing objects that were used for duplication.

The application object renamer 112 is responsible for renaming multiple application objects in response to a user request, and updating all dependencies that involve objects being renamed. As will be discussed in more detail below, in one embodiment, once the user selects multiple application objects on the screen and chooses a rename option for the selected objects, the user is presented with the current names of the selected objects. The user can then edit the name of a single object, and all other selected objects will be renamed accordingly.

Figure 2:
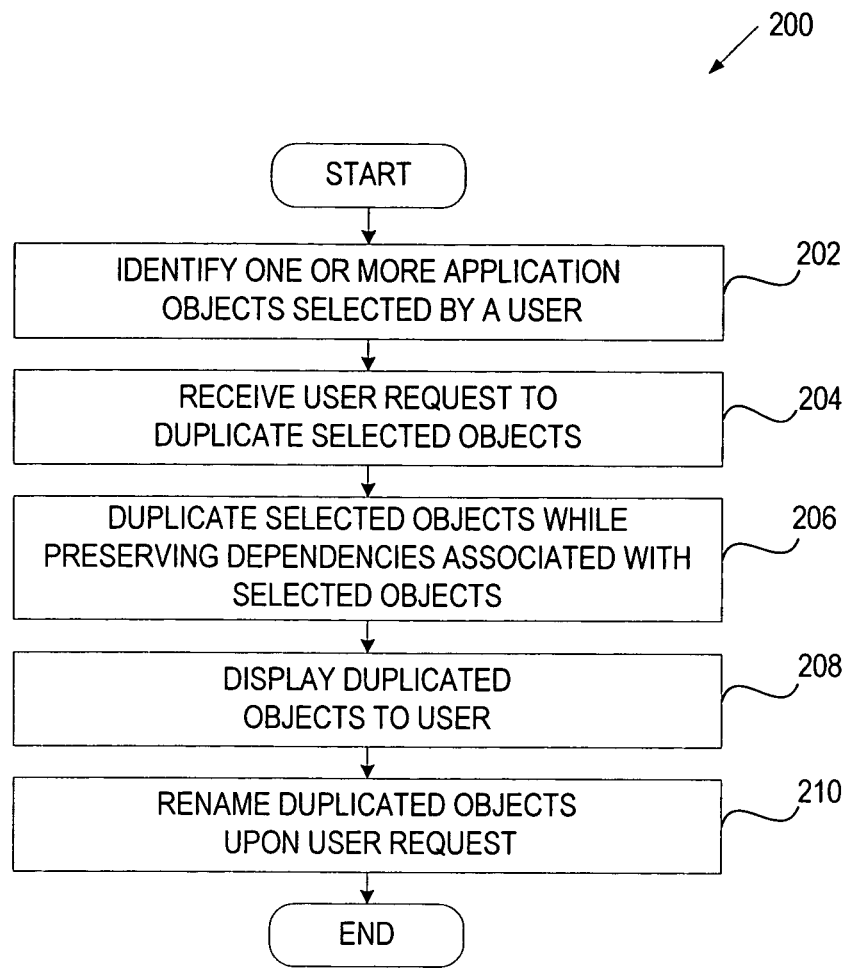
FIG. 2 is a flow diagram of one embodiment of a method for facilitating the duplication of application objects.

FIG. 2 is a flow diagram of one embodiment of a method 200 for facilitating the duplication of application objects. The method 200 may be performed by processing logic of the application design module 100. Processing logic may comprise hardware (e.g., circuitry, dedicated logic, programmable logic, microcode, etc.), software (such as run on a general purpose computer system or a dedicated machine), or a combination of both.

Referring to FIG. 2, method 200 begins with processing logic identifying one or more application objects selected by a user (block 202). In one embodiment, the application objects are selected by a user from application objects already created for this application. These objects may include, for example, application inputs, application outputs, valuators, etc. An exemplary UI that allows the user to select application objects will be discussed in more detail below in conjunction with FIGS. 3A-D.

At block 204, processing logic receives a user request to duplicate the selected objects. In response, processing logic duplicates the selected objects (block 206). In particular, in one embodiment, processing logic duplicates each selected object by copying data describing a relevant source object, assigning a default name to the duplicated object, and storing the copied data with the default name in the application data store 110. The copied data may specify, for example, characteristics of the object, behavior of the object, dependencies between this object and other objects, etc. The dependencies may be external (between this object and other non-duplicated objects) and internal (between this object and other duplicated objects). In one embodiment, processing logic maintains all dependencies between the duplicated object and non-duplicated objects, and duplicates every dependency between this duplicated object and other duplicated objects.

At block 204, processing logic displays the duplicated objects to the user. In one embodiment, the duplicated objects are displayed with default names. If the user wants to rename the duplicated objects, the user may issue a rename request. In response, processing logic renames the duplicated objects (block 210). In one embodiment, the user is allowed to issue the rename request for the entire group of duplicated objects. The user can then provide a new name for a single duplicated object, and this name will be used to automatically rename the entire group of duplicated objects. An exemplary user interface facilitating the group rename functionality will be discussed in more detail below in conjunction with FIG. 4.

Exemplary user interfaces will now be described with reference to FIGS. 3A-D and 4. The exemplary UIs may be generated in a variety of ways, such as using HyperText Markup Language (HTML), JavaScript, or the like. It will be understood that embodiments of the present invention are not limited to the UIs discussed herein.

Figure 3A:
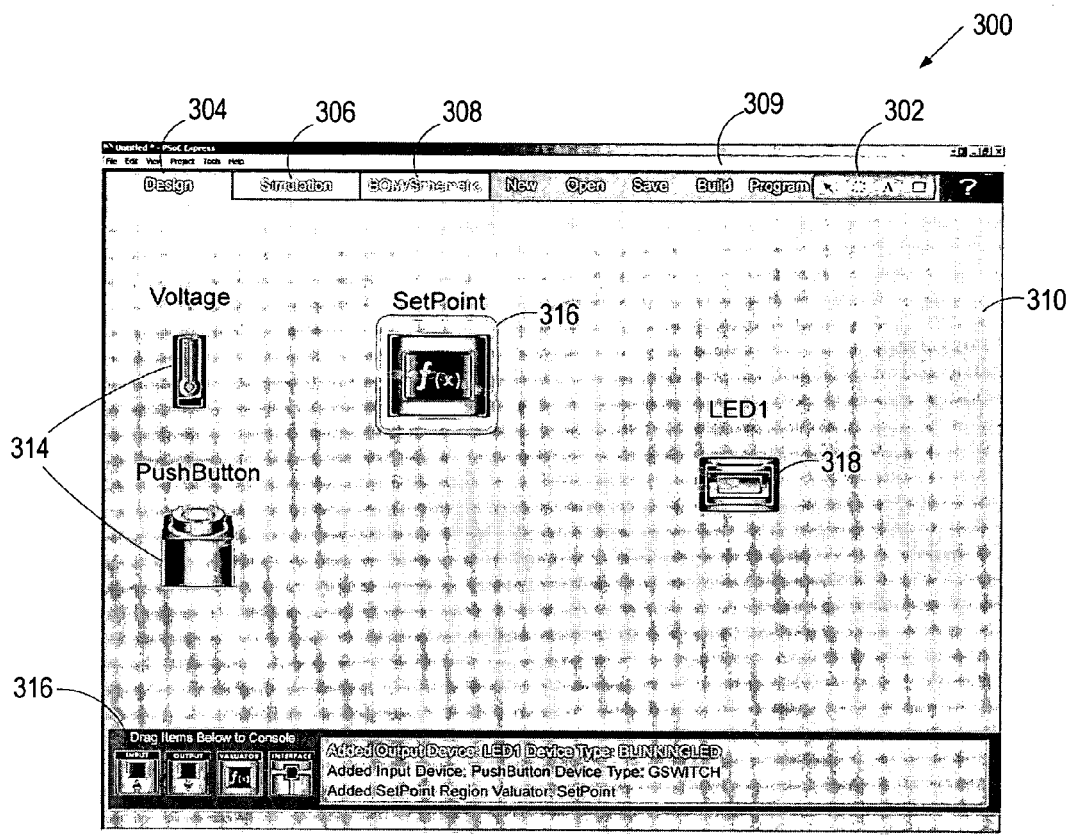
FIGS. 3A-3D and 4 illustrate exemplary UIs facilitating the design of a user application.
Figure 3B:
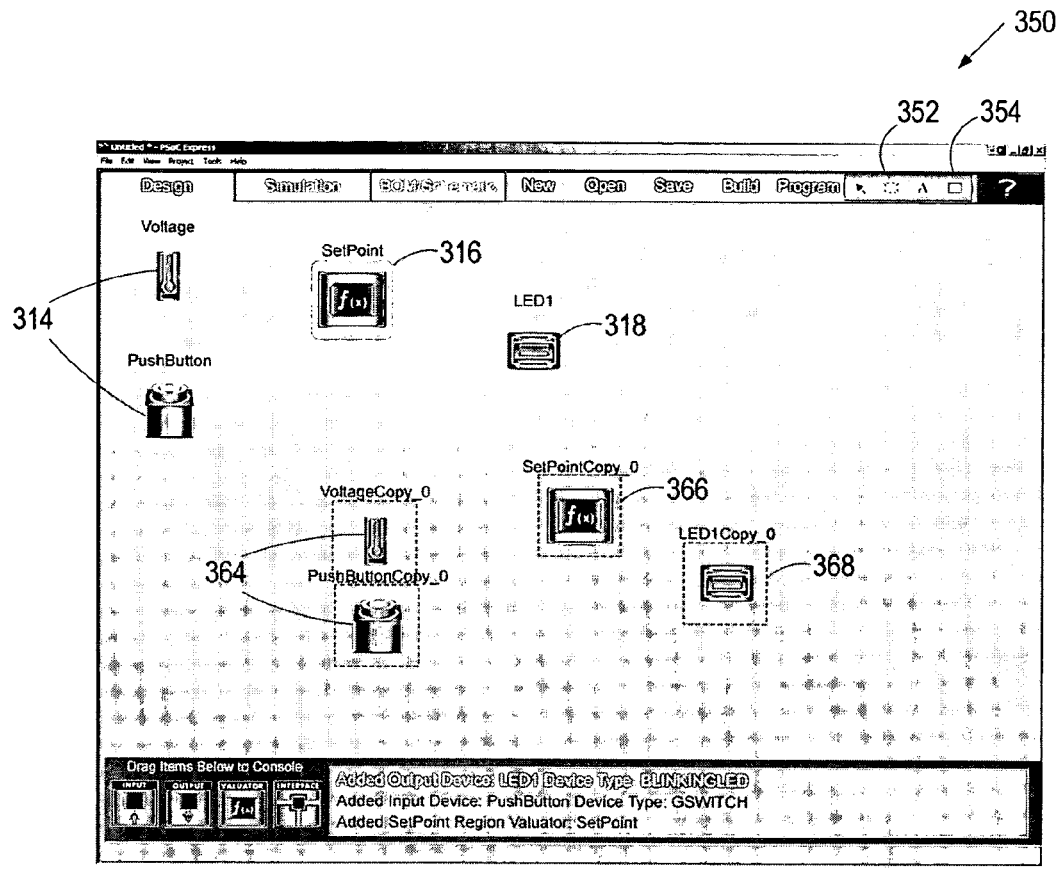
Figure 3C:
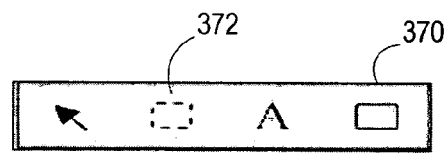

FIGS. 3A, 3B and 3C illustrate exemplary UIs facilitating the design of a user application. Referring to FIG. 3A, UI 300 includes a taskbar 302 and tabs for various stages in designing the user application. These tabs include Design 304, Simulation 306, and Bill of Materials/Schematic (BOM/Schem) 308. The Design tab 304 may be used for designing the user application. The Simulation tab 306 provides a software simulation of the user's application. The BOM/Schem tab 308 is used to generate a bill of materials, schematic and/or a datasheet for the user's application. The UI 300 may also include a Build button 309 that invokes the automated code functionality to automatically generate code for the user application without requiring the user to write any code.

The UI 300 also includes a workspace area 310 and a tray area 316. The user may use the tray 316 to select desired objects such as inputs, outputs and valuators, and drag them to the workspace area 310. In the example of FIG. 3A, the user has dragged inputs 314, a valuator 316 and output 318. The inputs 314 include a voltage input and a push-button switch. The setpoint valuator 316 digitizes the voltage input 314. The output 318 is a light-emitting diode (LED) whose state is controlled by the voltage and the switch position. The LED 318 is associated with a transfer function that defines its behavior. Generally, a transfer function defines the behavior of an output device or a valuator in response to one or more inputs. In the example of FIG. 3A, the pushbutton switch 314 and the setpoint valuator 316 may be inputs to a TableLookup Transfer Function. TableLookup is a graphical implementation of a truth table, where the inputs are combined into an exhaustive list of combinations that the user drags from a list and drops on a desired output state.

The entire collection of objects illustrated in FIG. 3A may be duplicated to create a second LED controlled by the same logic pertaining to a second voltage input, a second setpoint valuator and a second switch. In one embodiment, the duplication is performed if the user selects desired objects in the workspace 310 and chooses a duplication option for the selected objects. The user may select the desired objects by activating a selection button on the tool bar 302 and identifying the desired objects in the workspace 310 (e.g., by clicking on each desired screen object). Then, the user may activate any of the selected objects (e.g., via a right mouse click). In response, a context menu may be displayed including a duplication menu option. If the user selects the duplication option, duplicates of all selected objects are created.

FIG. 3B illustrates a UI 350 that presents source objects 314 though 318 and their duplicates 364 through 368. The dependencies between the duplicated objects 364 through 368 are the same as the dependencies between the source objects 314 through 318.

As shown in FIG. 3B, the duplicated objects are created with default names. The user may want to rename the duplicated objects. In one embodiment, the user can request the rename by selecting the desired objects and choosing a rename option for the selected objects. As discussed above, the user can select the desired objects by activating a selection button 352 on the tool bar 354 and identifying the desired objects (e.g., by clicking on each desired screen object). Then, the user may activate any of the selected objects (e.g., via a right mouse click). In response, a context menu may be displayed including a rename menu option. If the user selects the rename option, a multi-rename dialog may appear to allow the user to rename the selected objects, as will be discussed in more detail below in conjunction with FIG. 4.

FIG. 3C illustrates an exemplary toolbar 370 with a selection button 372. The activation of the selection button 372 triggers the selection mode. When the selection mode is on, the user can select a screen object by clicking on it. In response, a dashed border (e.g., a lime green dashed border) appears around the selected object to provide a clear indication of its selected state. To end the selection mode, the user can click anywhere outside of the screen objects.

Figure 3D:
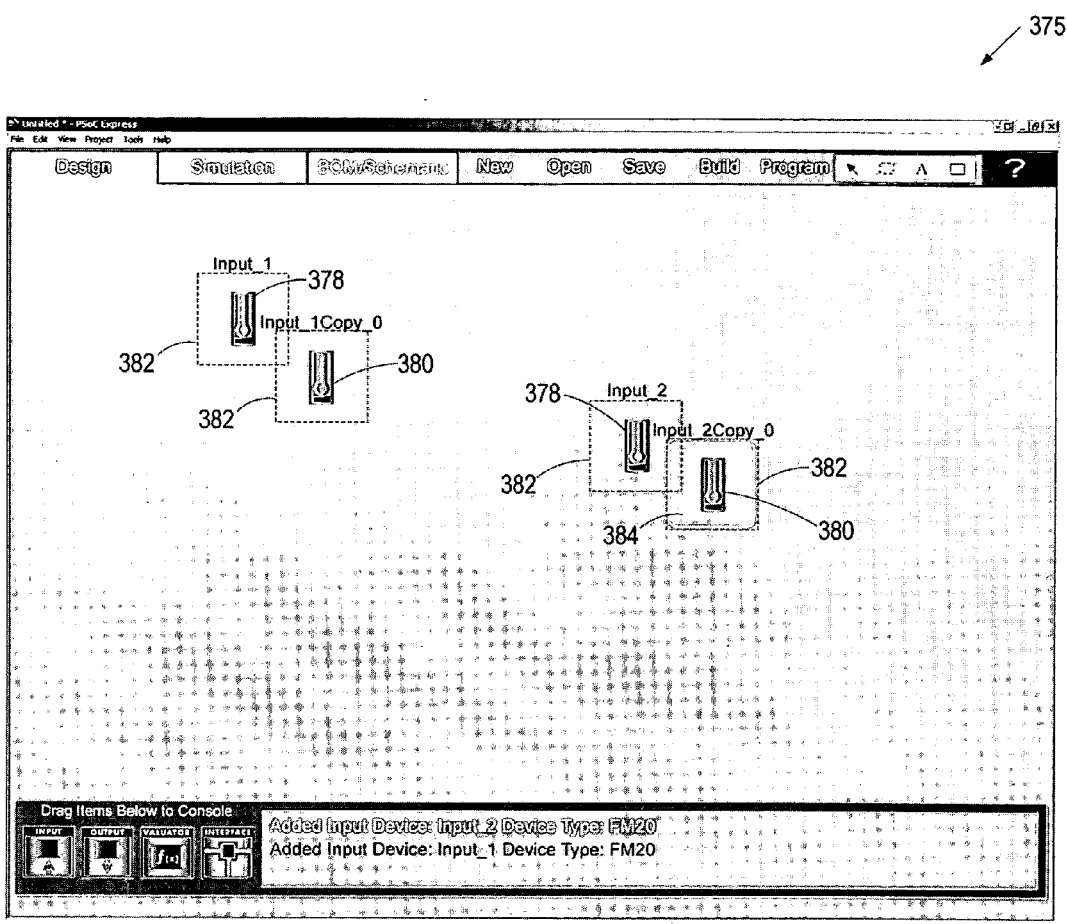

Referring to FIG. 3D, UI 375 displays two source objects 378 and their duplicates 380. The duplicates 380 are generated with default names. The number at the end of a default name may be incremented as necessary to assure uniqueness. After the duplication, the duplicated objects 380 may be selected as shown by their borders 382, and each duplicated object 380 may be placed over the source object 378, offset to the right and down as illustrated in FIG. 3D. Dragging (e.g., mouse down, mouse move, mouse up) any selected object may drag all selected objects maintaining their relative position.

If the user wants to renames all the objects on the screen, the user may also select the source objects 378 as shown by their borders 382, and then activate one of the selected objects (e.g., the duplicate of Input_2 as shown by box 384). In response, a context menu may be displayed including a rename menu option. If the user selects the rename option, a multi-rename dialog may appear to allow the user to rename the selected objects.

Figure 4:
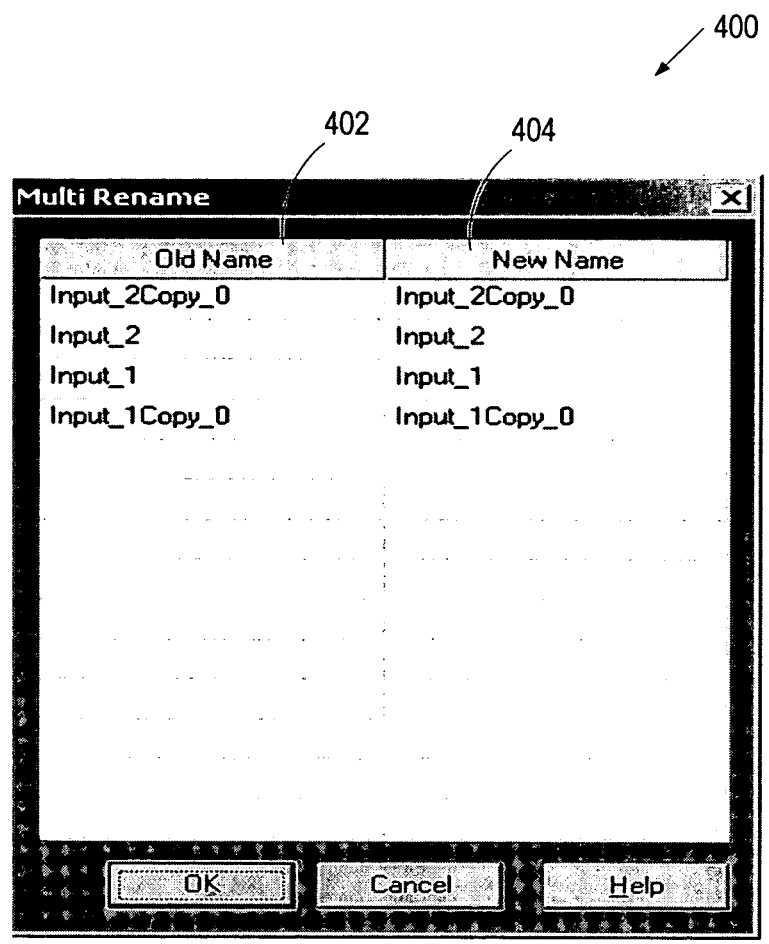

FIG. 4 illustrates an exemplary multi-rename dialog 400 that includes an old name column 402 and a new name column 404. The dialog 400 lists all objects selected by the user. In one embodiment, the user may click twice on a cell in the new name column 404 to enter edit mode, and then edit the name in this cell. If the user then clicks the OK button, all the listed objects are automatically renamed according to the provided name. In one embodiment, all dependencies existing in the application design are automatically updated to reflect the new names. In one embodiment, the rename is not performed if the user uses a reserved word or an existing instance name.

Figure 5:
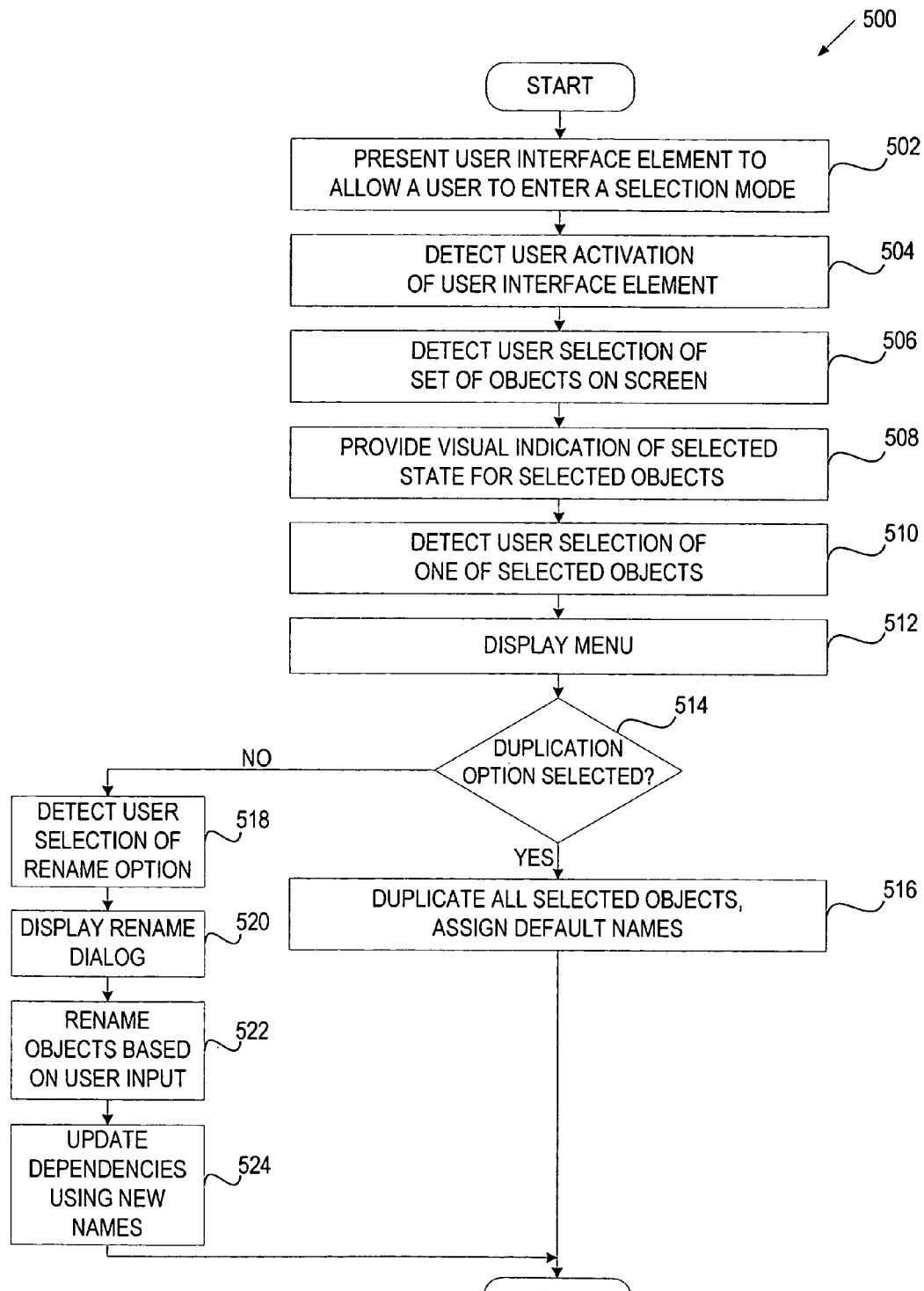
FIG. 5 is a flow diagram of one embodiment of a UI method for designing an application.

FIG. 5 is a flow diagram of one embodiment of a UI method 500 for designing an application. The method 500 may be performed by processing logic of the application design module 100. Processing logic may comprise hardware (e.g., circuitry, dedicated logic, programmable logic, microcode, etc.), software (such as run on a general purpose computer system or a dedicated machine), or a combination of both.

Referring to FIG. 5, method 500 begins with processing logic presenting a UI element to allow a user to enter a selection mode (block 502). In one embodiment, the UI element is a designated button on the toolbar.

At block 504, processing logic detects the activation of the UI element.

At block 506, processing logic detects the user selection of a set of screen objects. In response, processing logic provides a visual indication of the selected state for each selected object (block 508). This visual indication may be provided, for example, by displaying a dashed border around each selected object.

At block 508, processing logic detects the user selection of any of the selected objects. In response, processing logic displays a menu having a list of options (block 512).

If the user selects a duplication option (block 514), processing logic duplicates all selected objects, preserving dependencies associated with the selected objects, and assigns default names to the duplicated objects (block 516).

Alternatively, if the user selects a rename option (block 518), processing logic displays a rename dialog with the list of selected objects (block 520). If the user renames any listed object (block 522), processing logic renames all the other objects listed in the rename dialog (block 522) and updates the dependencies existing in the application using the new names (block 524).

Figure 6:
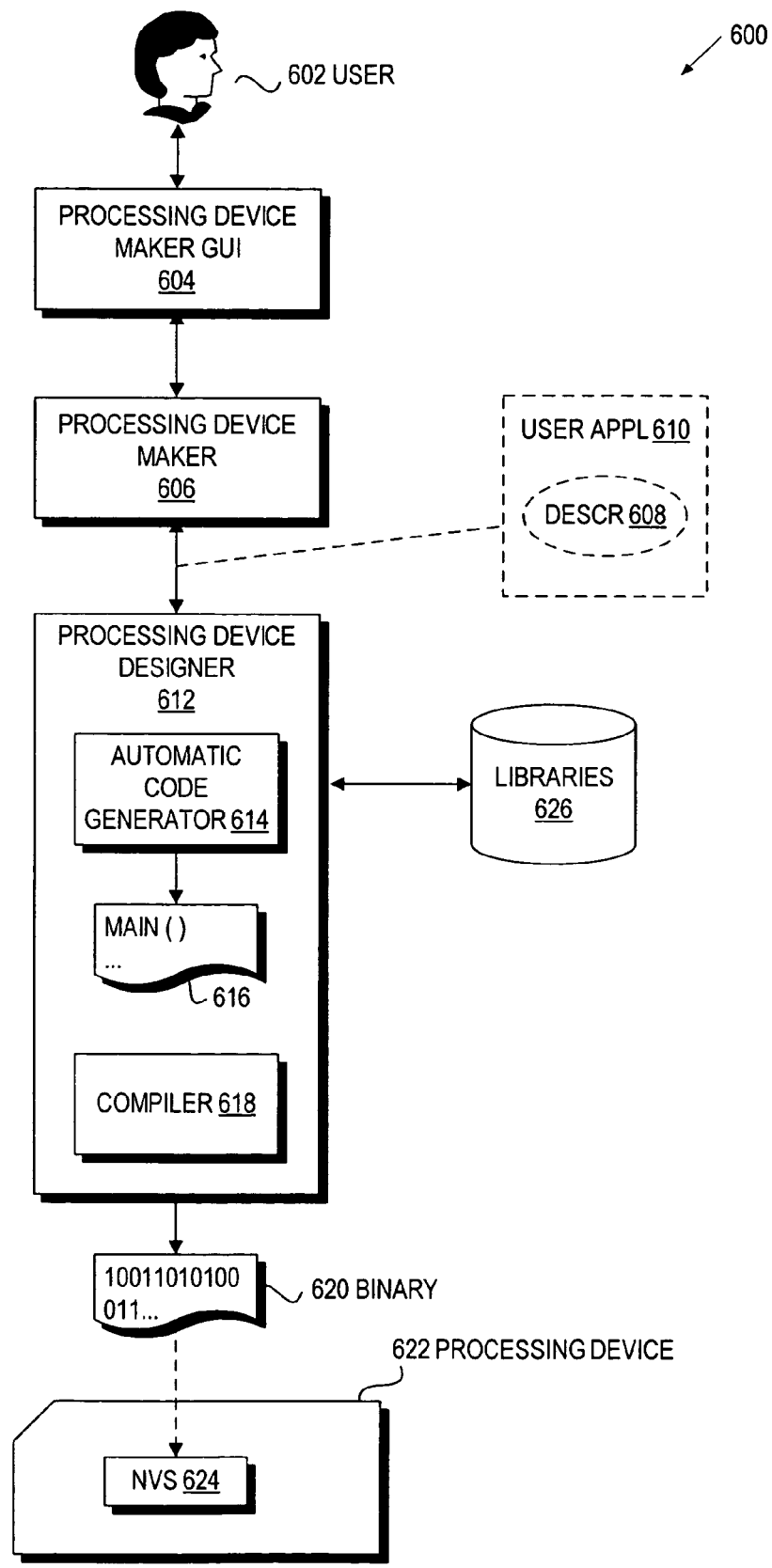
FIG. 6 is a block diagram of one embodiment of a system enabling automated code generation of processing device firmware.

FIG. 6 illustrates an exemplary system 600 in which embodiments of the present invention may operate. The system 600 provides automated code generation of processing device firmware in accordance with one embodiment of the present invention.

The system 600 includes a processing device maker GUI 604 that may be used by a user 602 to construct a user application 610 for implementation on a processing device 622. The processing device maker GUI 604 overlays a processing device maker 606. UIs 300, 350 and 375 discussed above in conjunction with FIGS. 3A, 3B and 3D may represent examples of the processing devices maker GUI 604. In addition, the application design module 100 of FIG. 1 may be used as part of the system 600 to generate the processing device maker GUI 604 and facilitate its functionality during the design of the user application 610.

The user application 610 may be described in a user application description 608. In one embodiment, the user application description 608 is a text file that describes the user's application 610.

After the user 602 completes the design of the application 610, the user 602 may perform a simulation of the user application 610. The simulation capability enables hardware independence by verifying the transfer function behavior without requiring the user to compile and debug the firmware on the targeted processing device. Simulation also includes the ability to create complex input files to exhaustively test the transfer function behavior with arbitrarily large combinations of input values. The simulation logs the outputs based on the transfer function behavior so that the results may be analyzed by the user.

Next, the user 602 may request via the processing device maker GUI 604 that processing device code be automatically generated. The user 602 does not have to perform any actual coding. In one embodiment, after the user 602 selects the targeted processing device, the user application description 608 is handed-off to a processing device designer 612 for the generation of processing device code. The processing device designer 612 may include an automatic code generator 614 that assembles the code for the user's application 610 based on the user application description 608. The automatic code generator 614 generates processing device code 616 (e.g., high-level language code, such as C, low-level code, such as Assembly, or a combination thereof).

In one embodiment, the automatic code generator 614 references libraries 626 that include code blocks that may be combined to form code 616. The automatic code generator 616 may use at least a portion of the user application description 608 as a guide in gathering together various code blocks. Some of the code blocks may be selected based at least in part on the targeted processing device 622

A compiler 618 compiles the code 616 to generate a binary 620, also known as a binary image or a Read-Only Memory (ROM) image. The binary 620 is loaded into a Non-Volatile Storage (NVS) 624 of the processing device 622. In one embodiment, NVS 624 includes Flash memory.

Embodiments of the processing device 622 may include one or more general-purpose processing devices, such as a microprocessor or central processing unit, a network processor, a microcontroller, an embedded Programmable Logic Device (PLD), or the like. Alternatively, the processing device may include one or more special-purpose processing devices, such as a Digital Signal Processor (DSP), an Application Specific Integrated Circuit (ASIC), a Field Programmable Gate Array (FPGA), or the like. The processing device may also include any combination of a general-purpose processing device and a special-purpose processing device.

It will be appreciated that because the code 616 is constructed from pre-built and pre-tested code libraries, time wasted on debugging, such as finding syntax errors, is eliminated. It will also be appreciated that the user 602 has generated the user application 610 without referencing a targeted processing device. Instead of choosing a processing device to implement a user application and then writing code for that processing device, embodiments of the present invention allow a user application to be created and then code automatically generated for a particular processing device. Moreover, a user may take a user application, make revisions to the user application, and quickly generate revised programming device code.

Figure 7:
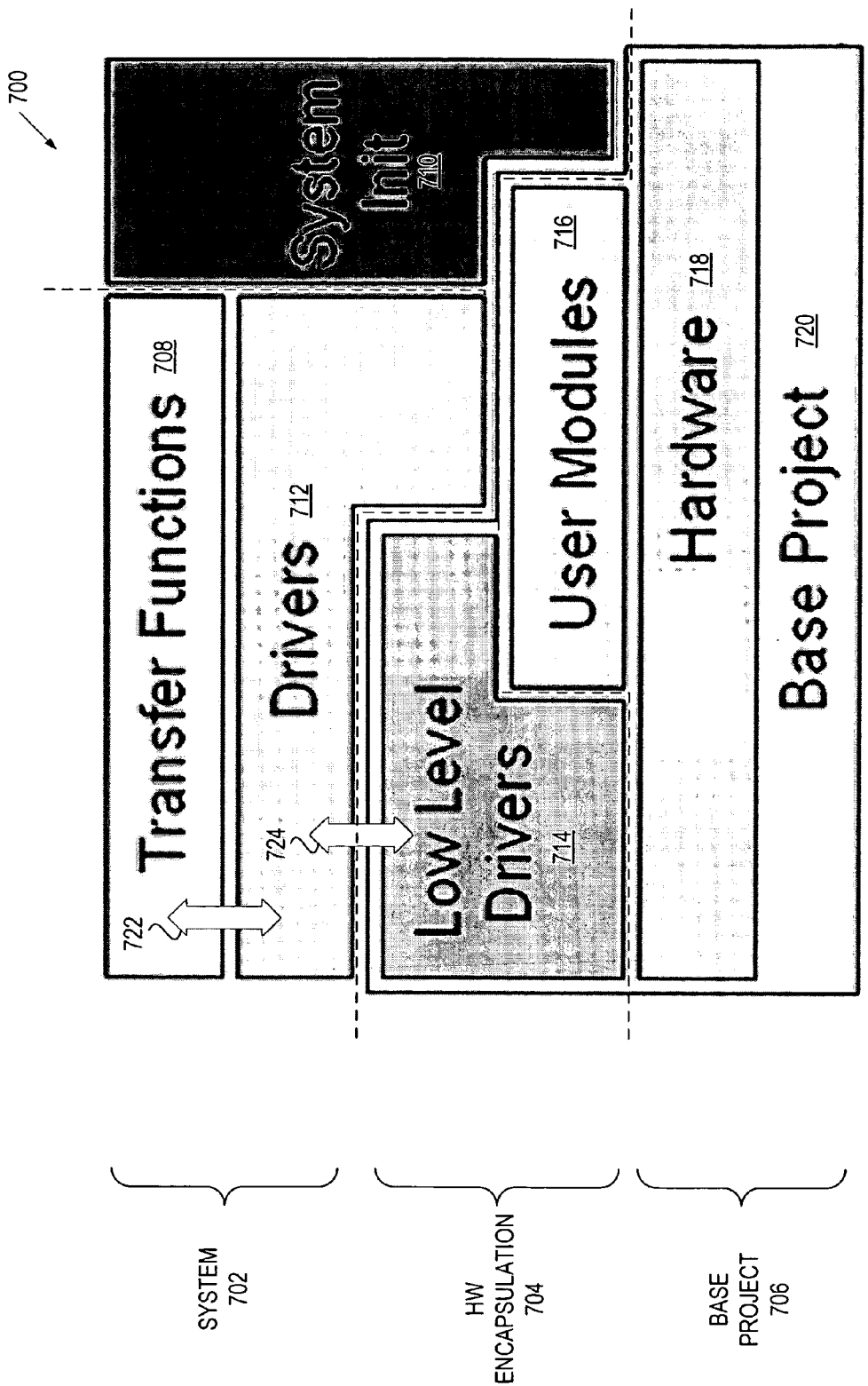
FIG. 7 illustrates a firmware stack in accordance with one embodiment of the present invention.

Referring to FIG. 7, a firmware stack 700 in accordance with one embodiment of the invention is shown. Firmware stack 700 shows a logical structure of at least a portion of the processing device code 616. As discussed below, a portion of the stack is abstracted away from specific hardware. Such hardware independency provides the automatic code generator a consistent architecture for stitching together various code blocks.

Firmware stack 700 includes a system layer 702, a hardware encapsulation layer 704, and a base project layer 706. As will be described further below, the functionality of the system layer 702 is independent of the targeted processing device. Also, interfaces, such as Application Program Interfaces (APIs), made between system layer 702 and the remaining layers of firmware stack 700 are standardized regardless of the targeted processing device. The term "standardized" refers to the hardware independence of the APIs. This abstraction away from specific hardware allows system layer 702 to function without regard to the particular hardware. The low layers of firmware stack 700 have "knowledge" of the specific hardware and take care of the implementation details for the system layer 702.

The hardware encapsulation layer 704 and the base project layer 706 are generated based at least in part on the targeted processing device. Hardware encapsulation layer 704 represents the underlying hardware to system layer 702. Base project layer 706 includes a set of standard functions associated with the targeted processing device hardware. Base project layer 706 may include functionality at the register level of the targeted processing device.

System layer 702 may include transfer functions 708 and drivers 712. System layer 702 is targeted by an application level mapping function. Transfer functions 708 invoke the transfer functions defined by the user 602.

Drivers 712 are usually associated with a hardware component of the processing device. In one embodiment, drives 712 may include three types: input, output, or interface. An output driver may be used with a device that is controlled by the user application, such as a fan or heater. Input drivers may be used for sensors, such as temperature or voltage sensors. Interface drivers may be used for devices that allow access to system variables and status, such as an Inter-Integrated Circuit (I2C) or a Serial Peripheral Interface (SPI).

Transfer functions 708 and drivers 712 may communicate with each other using APIs 722. Embodiments of an API include DriverName-Instantiate to initialize a device, DriverName_GetValue to return a value from an input device, and DriverName_SetValue to set an output of an output device to a specific value. Such APIs are defined such that the may be invoked regardless of the particular hardware.

Drivers 712 communicate with hardware encapsulation layer 704 using channels 724. Channels 724 are hardware independent. A channel may be further defined by a channel type, such as an input voltage channel, an output voltage channel, or the like. In one embodiment, channels 724 are implemented as APIs.

Hardware encapsulation layer 704 may include low level drivers 714 and system initialization 710. Low level drivers 714 provide the implementation of channels 724. In one embodiment, all drivers 712 use one or more channels 724 to communicate with low level drivers 714. In one embodiment, a channel may have associated parameters assigned by a low level driver, and the associated driver must conform to those parameters.

In one embodiment, the base project layer 706 includes User Modules (UMs) 716 and processing device hardware 718. User modules 716 are used with block arrays in processing device hardware 718 to form hardware components, such as an Analog-Digital Converter (ADC).

FIG. 7 also shows low level drivers 714, user modules 616, and Hardware 718 grouped into a Base Project 720.

Figure 8A:
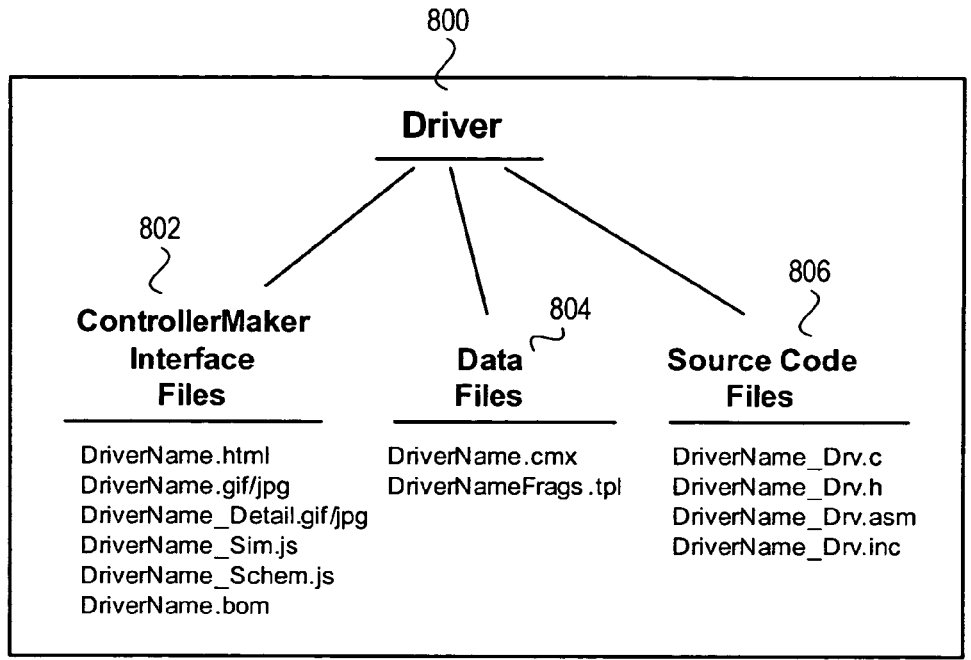
FIG. 8A illustrates a driver in accordance with one embodiment of the present invention.

Turning to FIG. 8A, an embodiment of driver 800 is shown. In one embodiment, driver 800 includes several components for device selection and code generation. These components may be grouped into ControllerMaker Interface files 802, Data files 804, and Source Code files 806. Interface files 802 may include files to generate the visual interface in processing device maker GUI 604. Data files 804 are used for driver type selection, resource allocation, user parameter selection, and code generation. Data files 804 may include a DriverName.cmx file that includes information about channel type, resource requirements, association with image files, and user selectable parameters. Source code files 806 include the driver firmware. Driver 800 may be written in C, Assembly, or a combination thereof.

Figure 8B:
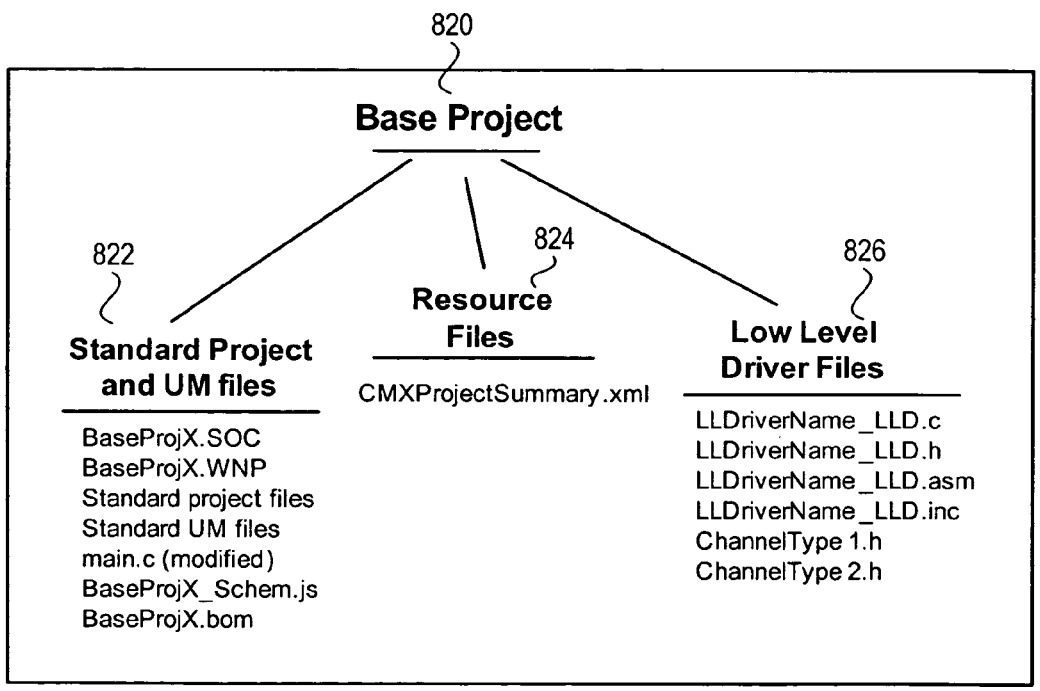
FIG. 8B illustrates a base project in accordance with one embodiment of the present invention.

Turning to FIG. 8B, an embodiment of a base project 820 is shown. In one embodiment, base project 820 is built around the targeted processing device. Automatic code generator 614 refers to user application description 608 and adds the appropriate code for the drivers and transfer functions. The standardized calls to and from the drivers provide a consistent architecture for reliably connecting base project 820 to drivers.

Base project 820 may include any system design project using any of the processing device family of parts that support one or more driver channel types. In one embodiment, if a base project supports a given channel type, it must support it fully. The channel may support an external interface to the input or output signal as well as low level firmware to support the signal acquisition and signal conditioning required for reliable signal measurement. Processing device designer 612 adds drivers, such as driver 800, to a base project to support the input/output devices selected by the user 602 in the user application 610. A project summary file is included in a base project to define what channel types are supported and how many channels are available.

Base project 820 may include standard project and UM files 822, resource files 824, and low level driver files 826. Standard project and UM files 822 may include files that describe the specific user modules employed in the design project and their specific placement. The UM's and their placement determine the mapping of the channels to the external pins. With the UM configuration file, specific UM API files are included in so much as they are needed to control specific interrupt behavior required for successful signal acquisition and conditioning. By themselves these files create an empty project.

Low level driver files 826 provide the implementation of the channels supported by a given base project. A variety of ways can be used to implement a given channel type. For example, a volts channel can be supported by a wide range of ADCs, multiplexers, and ADC resolutions, as long as the API for the specific channel is fully supported. Some base projects may offer more resolution than others for certain channel types. These differences may be specified in a project summary file (in one embodiment, a CMXProjectSummary.xml file).

Resource files may include a CMXProjectSummary.xml file. This eXtensible Markup Language (XML) file contains metadata that communicate a list of resources provided by the base project to the CMX engine. The XML file indicates the types and count of each of the resource channels and interfaces supported. It also determines the channel assignment order and prioritization, in the case of channels competing for similar resources. It may also provide specifications of each of the channel types, where applicable.

Figure 9:
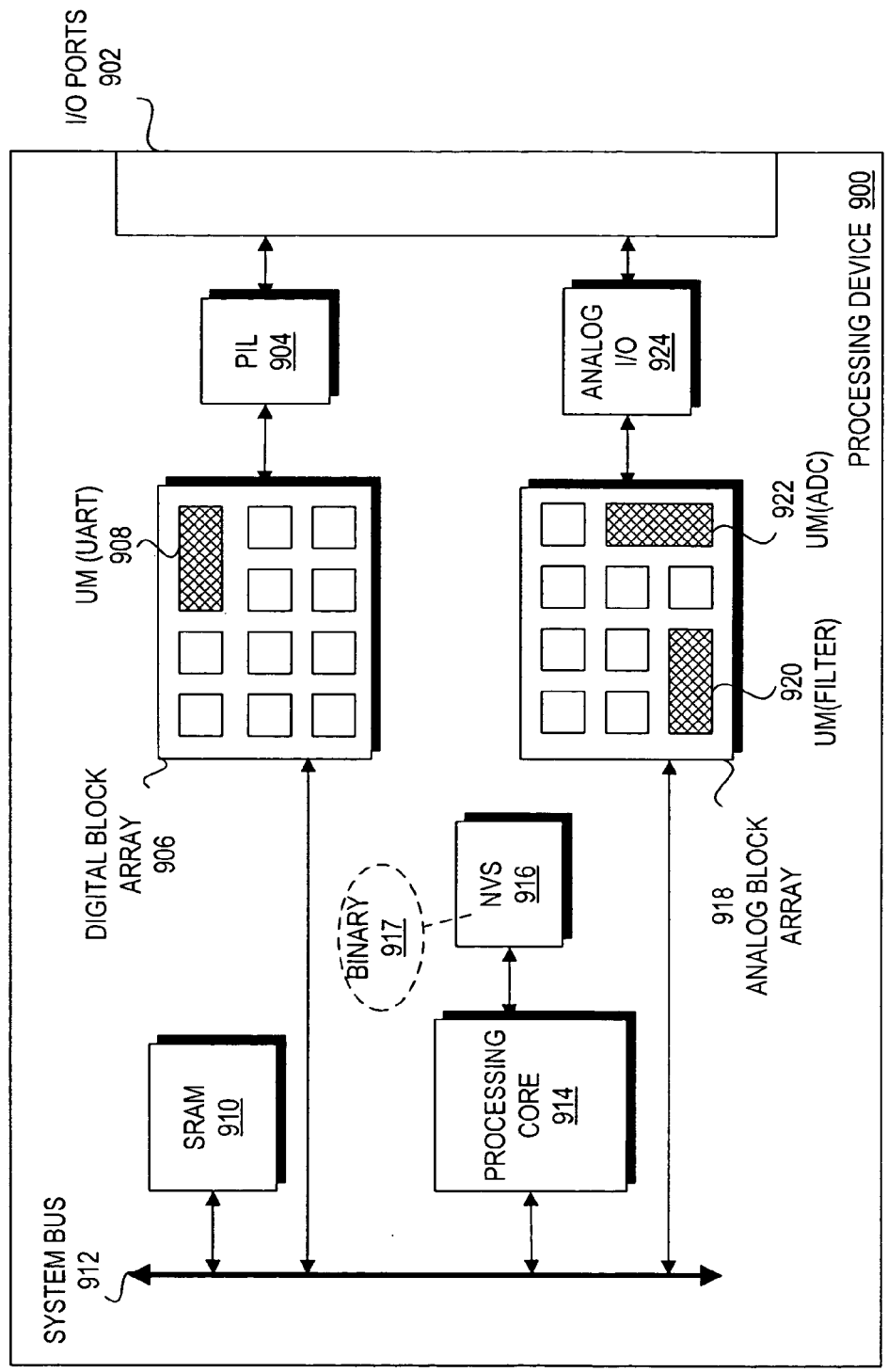
FIG. 9 is a block diagram of one embodiment of a processing device.

Turning to FIG. 9, an embodiment of a processing device 900 is shown. Processing device 900 includes a microcontroller. Processing device 900 includes Input/Output (I/O) ports 902. In one embodiment, I/O ports 902 are programmable. I/O ports 902 are coupled to a Programmable Interconnect and Logic (PIL) 904 which is coupled to a digital block array 906. In FIG. 9, digital block array 906 includes a UM 908 that has been configured as a Universal Asynchronous Receive/Transmitter (UART). Digital block array 906 is coupled to a system bus 912.

A Static Random Access Memory (SRAM) 910 and a processing core 914 are also coupled to system bus 912. Processing core 914 is coupled to NVS 916 which has stored a binary 917. In one embodiment, binary 917 includes instructions generated as described herein. In another embodiment, binary 917 may include instructions executable by processing core 914 as well as instructions for configuring block arrays 916 and 918.

Analog block array 918 is coupled to system bus 912. In the embodiment of FIG. 9, analog block array 918 includes a UM 920 configured as a filter and a UM 922 configured as an ADC. Analog block array 918 is also coupled to an analog I/O unit 924 which is coupled to I/O ports 902. Processing device 900 may also include other components, not shown for clarity, including a clock generator, an interrupt controller, an I2C, or the like.

Figure 10:
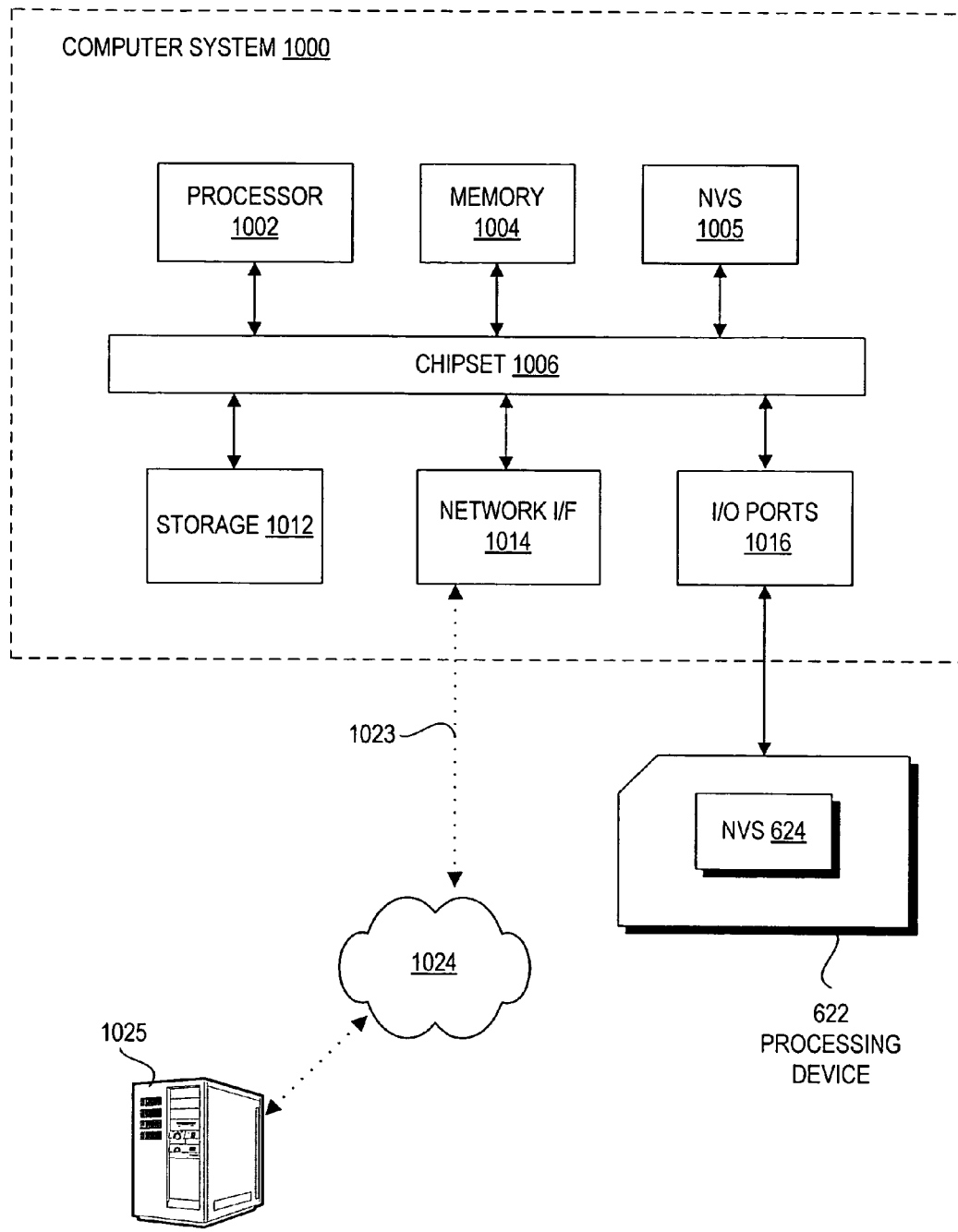
FIG. 10 is a block diagram of one embodiment of a computer system.

FIG. 10 illustrates an exemplary computer system 1000 on which embodiments of the present invention may be implemented. Computer system 1000 includes a processor 1002 and a memory 1004 coupled to a chipset 1006. Storage 1012, Non-Volatile Storage (NVS) 1005, network interface (I/F) 1014, and Input/Output (I/O) ports 1018 may also be coupled to chipset 1006. Embodiments of computer system 1000 include, but are not limited to, a desktop computer, a notebook computer, a server, a personal digital assistant, a network workstation, or the like. In one embodiment, processor 1002 executes instructions stored in memory 1004.

Memory 1004 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like.

Chipset 1006 may include a memory controller and an input/output controller. Chipset 1006 may also include system clock support, power management support, audio support, graphics support, or the like. In one embodiment, chipset 1006 is coupled to a board that includes sockets for processor 1002 and memory 1004.

Components of computer system 1000 may be connected by various interconnects. Such interconnects may include a Peripheral Component Interconnect (PCI), a System Management bus (SMBUS), a Low Pin Count (LPC) bus, a Serial Peripheral Interface (SPI) bus, an Accelerated Graphics Port (AGP) interface, or the like.

I/O ports 1016 may include ports for a keyboard, a mouse, a display, a printer, a scanner, or the like. Embodiments of I/O ports 1016 include a Universal Serial Bus port, a Firewire port, a Video Graphics Array (VGA) port, a Personal System/2 (PS/2) port, or the like.

Processing device 622 may be coupled to computer system 1000 via I/O ports 1016. Computer system 1000 may have stored computer-readable instructions, in accordance with embodiments described herein, to allow a user to design the application 610 using UIs described herein and automatically generate processing device code for processing device 622 using computer system 1000. This code may be compiled into a binary and loaded into NVS 624.

Computer system 1000 may interface to external systems through network interface 1014. Network interface 1014 may include, but is not limited to, a modem, a Network Interface Card (NIC), or other interfaces for coupling a computer system to other computer systems. A carrier wave signal 1023 may be received/transmitted by network interface 1014. In the embodiment illustrated in FIG. 10, carrier wave signal 1023 is used to interface computer system 1000 with a network 1024, such as a Local Area Network (LAN), a Wide Area Network (WAN), the Internet, or any combination thereof. In one embodiment, network 1024 is further coupled to a computer system 1025 such that computer system 1000 and computer system 1025 may communicate over network 624.

Computer system 1000 also includes non-volatile storage 1005 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like. Storage 1012 includes, but is not limited to, a magnetic disk drive, a magnetic tape drive, an optical disk drive, or the like. It is appreciated that instructions executable by processor 1002 may reside in storage 1012, memory 1004, non-volatile storage 1005, or may be transmitted or received via network interface 1014.

For the purposes of the specification, a machine-readable medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-readable medium includes, but is not limited to, recordable/non-recordable media (e.g., Read-Only Memory (ROM), Random Access Memory (RAM), magnetic disk storage media, optical storage media, a flash memory device, etc.).

Various operations of embodiments of the present invention are described herein. These operations may be implemented by a machine using a processor, an Application Specific Integrated Circuit (ASIC), a Field Programmable Gate Array (FPGA), or the like. In one embodiment, one or more of the operations described may constitute instructions stored on a machine-readable medium, that when executed by a machine will cause the machine to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising: identifying a first application object and a second application object in a data store selected by a user when designing an embedded application for a programmable processing system, the programmable processing system comprising a microcontroller, a programmable interconnect and a digital block array; identifying internal dependencies and external dependencies associated with the selected objects, wherein the internal dependencies comprise dependencies between the selected objects and the external dependencies comprise dependencies between the selected objects and a third, unselected, application object in the data store, wherein the first application object comprises an application input, the second application object comprises an application output, the second application object is associated with a transfer function defining a behavior of the application output in response to the application input; generating, by a computer, a duplicate set of one or more application objects by duplicating the first application object and the second application object in the data store and creating the same internal dependencies between the duplicated objects as exist between the selected objects and creating the same external dependencies between the duplicated objects and the third application object as exist between the selected objects and the third application object, wherein the third application object is not copied; renaming the duplicated objects using new names specified by the user; and updating the internal dependencies based on the new names.

2. The method of claim 1 wherein the one or more objects comprise at least one of a valuator, an input and an output.

3. The method of claim 1 further comprising: displaying the one or more objects on a screen; and allowing the user to select the one or more objects on the screen.

4. The method of claim 3 further comprising: displaying the duplicated objects on the screen.

5. The method of claim 3 wherein allowing the user to select the one or more objects on the screen comprises: presenting a user interface (UI) element to allow the user to enter a selection mode; detecting a user activation of the UI element; detecting a user selection of the one or more objects on the screen; and providing a visual indication of a selected state of the one or more objects.

6. The method of claim 3 further comprising: detecting a user selection of one of the selected objects; displaying a menu facilitating a user activation of a duplication option; and receiving the user activation of the duplication option in the menu.

7. The method of claim 4 wherein the duplicated objects are displayed with default names.

8. The method of claim 5 wherein the UI element comprises a selection button on a tool bar.

9. The method of claim 5 wherein the visual indication of the selected state is provided by displaying a border around each of the one or more objects.

10. A non-transitory machine-readable storage medium storing a plurality of instructions which when executed by a computer, cause the computer to perform a method comprising:

identifying a first application object and a second application object in a data store selected by a user when designing an embedded application for a programmable processing system, the programmable processing system comprising a microcontroller, a programmable interconnect and a digital block array; identifying internal dependencies and external dependencies associated with the selected objects, wherein the internal dependencies comprise dependencies between the selected objects and the external dependencies comprise dependencies between the selected objects and a third, unselected, application object in the data store, wherein the first application object comprises an application input, the second application object comprises an application output, the second application object is associated with a transfer function defining a behavior of the application output in response to the application input; and generating, by the computer, a duplicate set of one or more application objects by duplicating the first application object and the second application object in the data store and creating the same internal dependencies between the duplicated objects as exist between the selected objects and creating the same external dependencies between the duplicated objects and the third application object as exist between the selected objects and the third application object, wherein the third application object is not copied.

11. The non-transitory machine-readable storage medium of claim 10 wherein the one or more objects comprise at least one of a valuator, an input and an output.

12. The non-transitory machine-readable storage medium of manufacture of claim 10 wherein the method further comprises:

displaying the one or more objects on a screen;
allowing the user to select the one or more objects on the screen; displaying the duplicated objects on the screen; renaming the duplicated objects using new names specified by the user;
and updating the internal dependencies based on the new names.

13. An apparatus comprising:

an application data store comprising hardware to store data describing a plurality of objects pertaining to an embedded application being designed, the embedded application for a programmable processing system, the programmable processing system comprising a microcontroller, a programmable interconnect and a digital block array; and an application design module to identify a first object and a second object in a data store selected by a user from the plurality of objects, to identify internal dependencies and external dependencies associated with the selected objects, wherein the internal dependencies comprise dependencies between the selected objects and the external dependencies comprise dependencies between the selected objects and a third, unselected, object in the data store, wherein the first object comprises an application input, the second object comprises an application output, the second object is associated with a transfer function defining a behavior of the application output in response to the application input, and to duplicate the first object and the second object in the data store and create the same internal dependencies between the duplicated objects as exist between the selected objects and create the same external dependencies between the duplicated objects and the third object as exist between the selected objects and the third object, wherein the third object is not copied.

14. The apparatus of claim 13 wherein: the one or more objects comprise at least one of a valuator, an input and an output.

15. The apparatus of claim 13 wherein the application design module is further to display the one or more objects on a screen, to display the duplicated objects on the screen, to rename the duplicated objects based on new names provided by the user, and to update the internal dependencies based on the new names.

16. The apparatus of claim 15 wherein the application design module is further to detect a user selection of one of the selected objects, to display a menu facilitating a user activation of a duplication option, and to receive the user activation of the duplication option in the menu.

17. A system comprising: a processor; and a memory coupled to the processor, the memory to store a user interface generated by the processor, the user interface comprising: a user interface element to initiate a selection mode when activated by a user; and a workspace area to allow a user to select, in the selection mode, a first object and a second object of a plurality of objects in a data store pertaining to an embedded application for a programmable processing system, the programmable processing system comprising a microcontroller, a programmable interconnect and a digital block array, the first object and the second object having internal dependencies between the selected objects and external dependencies between the selected objects and a third, unselected, object in the data store, wherein the first object comprises an application input, the second object comprises an application output, the second object is associated with a transfer function defining a behavior of the application output in response to the application input, and to present duplicates of the first object and the second object in the data store in response to a user request, the duplicate objects having the same internal dependencies between the duplicate objects as exist between the selected objects and having the same external dependencies between the duplicated objects and the third object as exist between the selected objects and the third object, wherein the third object is not copied.

18. The system of claim 17 wherein: the plurality of objects represents at least one of a valuator, an input or an output.

19. The system of claim 17 wherein the user interface provides a visual indication of a selected state of the selected subset of the plurality of objects by displaying a border around each object.

20. The system of claim 17 wherein the user interface element comprises a selection button on a tool bar.

21. The system of claim 17 wherein in response to the user selection of the subset of the plurality of object, the workspace area displays a menu facilitating a user activation of a duplication option.

* * * * *